(12) United States Patent
Nakauchi et al.

(10) Patent No.: US 9,972,987 B2
(45) Date of Patent: May 15, 2018

(54) GAS INSULATION DEVICE

(71) Applicant: MITSUBISHI ELECTRIC CORPORATION, Chiyoda-ku, Tokyo (JP)

(72) Inventors: Shinichiro Nakauchi, Tokyo (JP); Manabu Yoshimura, Tokyo (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 0 days. days.

(21) Appl. No.: 15/308,657

(22) PCT Filed: Jun. 25, 2014

(86) PCT No.: PCT/JP2014/066831
§ 371 (c)(1),
(2) Date: Nov. 3, 2016

(87) PCT Pub. No.: WO2015/198420
PCT Pub. Date: Dec. 30, 2015

(65) Prior Publication Data
US 2017/0149226 A1 May 25, 2017

(51) Int. Cl.
*H02G 5/06* (2006.01)
*H02B 13/035* (2006.01)
*H01F 27/32* (2006.01)

(52) U.S. Cl.
CPC .......... *H02G 5/063* (2013.01); *H01F 27/321* (2013.01); *H02B 13/035* (2013.01)

(58) Field of Classification Search
CPC .......... H02G 5/063; H02G 5/06; H02G 5/061; H02B 13/035; H02B 13/00; H02B 13/02;
(Continued)

(56) References Cited

U.S. PATENT DOCUMENTS 3,389,214 A 6/1968 Smothers
3,710,002 A * 1/1973 Link ...................... H01F 27/02
174/17 LF
(Continued)

FOREIGN PATENT DOCUMENTS

EP 2 405 550 A1 1/2012
JP S62-141909 A 6/1987
(Continued)

OTHER PUBLICATIONS

International Search Report (PCT/ISA/210) dated Jul. 22, 2014, by the Japanese Patent Office as the International Searching Authority for International Application No. PCT/JP2014/066831.
(Continued)

*Primary Examiner* — Angel R Estrada
(74) *Attorney, Agent, or Firm* — Buchanan Ingersoll & Rooney PC

(57) ABSTRACT

Provided is a gas insulation device that includes a grounded metal tank in which an insulation gas is encapsulated; a conductor which is provided in the tank, on a surface of which an alumite film on which sealing treatment is performed is formed, and across which a voltage is applied; an insulating coat provided on an inner surface of the tank; and a coat that is provided on the coat and that includes an insulation material containing a non-linear resistive material.

10 Claims, 8 Drawing Sheets

(58) Field of Classification Search
CPC .......... H01F 27/321; H05K 5/00; H05K 5/02; H05K 5/0217
USPC ..... 174/17 GF, 17 R, 50, 520; 361/600, 601, 361/612, 618
See application file for complete search history.

(56) References Cited

U.S. PATENT DOCUMENTS

| | | | | |
|---|---|---|---|---|
| 3,809,933 | A * | 5/1974 | Sugawara | H02K 9/20 174/DIG. 32 |
| 7,947,900 | B2 * | 5/2011 | Cheng | H05K 5/04 174/50 |
| 2009/0197116 | A1 * | 8/2009 | Cheng | H05K 9/0088 428/651 |

FOREIGN PATENT DOCUMENTS

| | | |
|---|---|---|
| JP | 05-029152 U | 4/1993 |
| JP | 08-237836 A | 9/1996 |
| JP | 4177628 B | 11/2008 |
| JP | 2010-207047 A | 9/2010 |
| JP | 2012-210108 A | 10/2012 |

OTHER PUBLICATIONS

Written Opinion (PCT/ISA/237) dated Jul. 22, 2014, by the Japanese Patent Office as the International Searching Authority for International Application No. PCT/JP2014/066831.
Extended European Search Report dated Jan. 16, 2018, issued by the European Patent Office in corresponding European Application No. 14895607.1. (7 pages).

* cited by examiner

GAS INSULATION DEVICE

FIELD

The present invention relates to a gas insulation device in which a conductor, which is an energization part, is housed in a grounded tank and an insulation gas is encapsulated in the tank.

BACKGROUND

In the gas insulation device, an insulation gas is encapsulated in a space between a metal tank at ground potential and a conductor which is installed in the tank and across which a voltage is applied, whereby insulation performance is secured.

However, when a tiny metal foreign substance is mixed in the tank, the metal foreign substance is charged and moved in a reciprocating manner in a radial direction in the tank due to the influence of the electric field generated by the energized conductor, and a decrease in the withstanding voltage can be caused. Thus, it is necessary to control the behavior of the metal foreign substance in the tank.

A conventional gas insulation device is designed in such a manner that an insulating coating material is applied to an inner surface of a tank and movement of an electric charge from the inner surface of the tank to a metal foreign substance is controlled to prevent an electric charge having an opposite polarity to a conductor from being accumulated in the metal foreign substance; to control floating of the metal foreign substance due to electric attraction force that affects the metal foreign substance becoming larger than weight of the metal foreign substance; and to prevent the metal foreign substance from being attached to a conductor and causing a flashover.

Also, in Patent Literature 1, a gas insulation device in which a coating material containing a zinc oxide (ZnO) having a non-linear resistance characteristic is applied to an inner surface of a tank is described.

Also, in Patent Literature 2, a technology of applying non-linear resistance coating on a barrier insulator is described as a coating technology in a gas insulation device.

CITATION LIST

Patent Literature

Patent Literature 1: Japanese Patent Application Laid-Open. No. 2010-207047
Patent Literature 2: Japanese Patent No. 4177628

SUMMARY

Technical Problem

The above-described configuration in which an insulating coating material is applied to an inner surface of a tank is effective in controlling a behavior of a metal foreign substance in a case where voltage applied to a conductor is low. However, in a case where voltage is high, an electric charge having an opposite polarity to the conductor is collected to a polarization of the metal foreign substance on a coating film, that is, to a side of the conductor in the metal foreign substance. Thus, electric attraction force that affects the metal foreign substance becomes larger than weight of the metal foreign substance and the metal foreign substance floats. Further, in a case where electric field strength becomes equal to or higher than ionization strength of an insulation gas, an electric charge is supplied and accumulated in the metal foreign substance due to generation of partial discharge; and electric attraction force that affects the metal foreign substance becomes larger than the weight of the metal foreign substance, whereby the metal foreign substance floats. In such a manner, the configuration of applying an insulating coating material to an inner surface of a tank is effective in controlling the behavior of a metal foreign substance in a case where the voltage is low. However, it is difficult to control the behavior of the metal foreign substance in a case where the voltage is high.

Also, in a configuration of applying a coating material containing a zinc oxide to an inner surface of a tank in a manner described in Patent Literature 1, since a coating film containing a zinc oxide has a high insulation property and blocks movement of an electric charge from the inner surface of the tank to a metal foreign substance in a case where voltage is low, an effect similar to that in the case where an insulating coating material is applied to an inner surface of a tank is acquired. On the other hand, in a case where voltage is high, this coating film containing a zinc oxide shows a conductive property and permits movement of an electric charge between the inner surface of the tank and the metal foreign substance. Thus, it is possible to release an electric charge of the metal foreign substance from the metal foreign substance to the tank in a film thickness direction. However, in this case, this coating film containing a zinc oxide also permits movement of an electric charge, which has an opposite polarity to a conductor, from the inner surface of the tank to the metal foreign substance. Thus, it becomes difficult to control the charging due to movement of the electric charge and becomes difficult to control a behavior of the metal foreign substance.

Also, the coating technology described in Patent Literature 2 is to control discharge development and to securely confine discharge into a gas space on an inner side of a barrier insulator, and it is different from what is to control a behavior of a metal foreign substance on an inner surface of a tank.

The present invention is made in view of the forgoing and is to provide a gas insulation device that can control a behavior of a metal foreign substance.

Solution to Problem

In order to solve the problem and achieve the objective mentioned above, the present invention relates to a gas insulation device that includes: a grounded metal tank that contains therein an insulation gas; a conductor provided in the tank and across which a voltage is applied, a surface of the conductor being formed with an alumite film that has been processed a sealing treatment; an insulation part provided on an inner surface of the tank; and a non-linear resistive part provided on the insulation part and formed of insulation material containing non-linear resistive material.

Advantageous Effects of Invention

According to the present invention, movement of an electric charge from an inner surface of a tank to a metal foreign substance is blocked by an insulation part. Also, in a case where electric field strength in a periphery of the metal foreign substance that is contact with a non-linear resistive part is high, the non-linear resistive part shows a conductive property in the periphery of the metal foreign substance and an electric charge is released from the metal foreign substance to the non-linear resistive part, whereby it becomes possible to control a behavior of the metal foreign substance so as to relax an electric field in the periphery of the metal foreign substance and further to control generation of partial discharge.

Further, according to the present invention, since an alumite film on which sealing treatment is performed is formed on a surface of a conductor, it becomes possible to control discharge from the surface of the conductor and to relax micro electric field concentration on the surface of the conductor. Thus, it is possible to control a decrease in a withstanding voltage due to an electrode area effect and to apply a gas insulation device with high insulation reliability.

Moreover, according to the present invention, it is possible to improve voltage-withstanding performance and is possible to reduce a diameter of a tank.

DESCRIPTION OF EMBODIMENTS

In the following, a gas insulation device according to embodiments of the present invention will be described in detail with reference to the drawings. Note that the present invention is not limited to these embodiments.

First Embodiment

Figure 1:
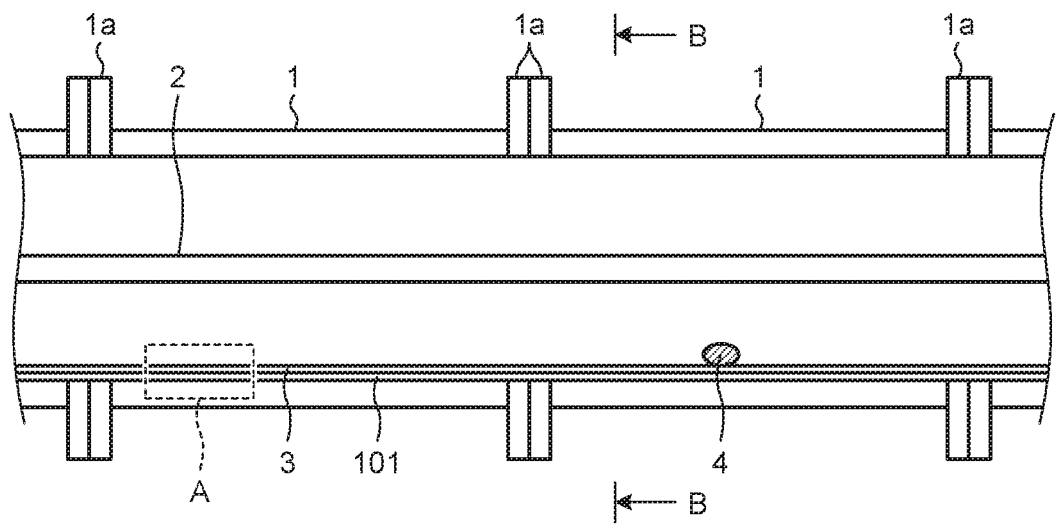
FIG. 1 is a longitudinal sectional view illustrating a configuration of a gas insulation device according to a first embodiment.
Figure 2:
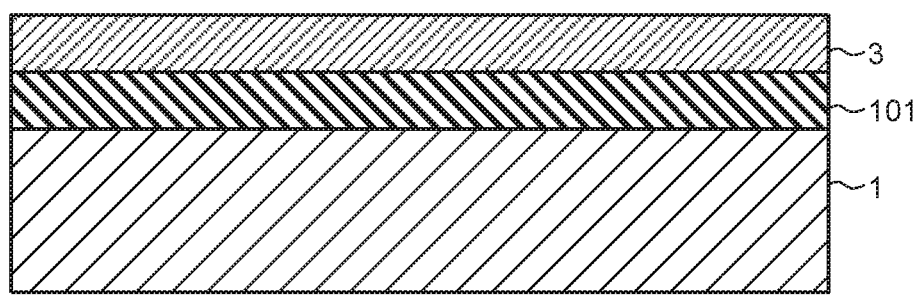
FIG. 2 is an enlarged view of an A part in FIG. 1.
Figure 3:
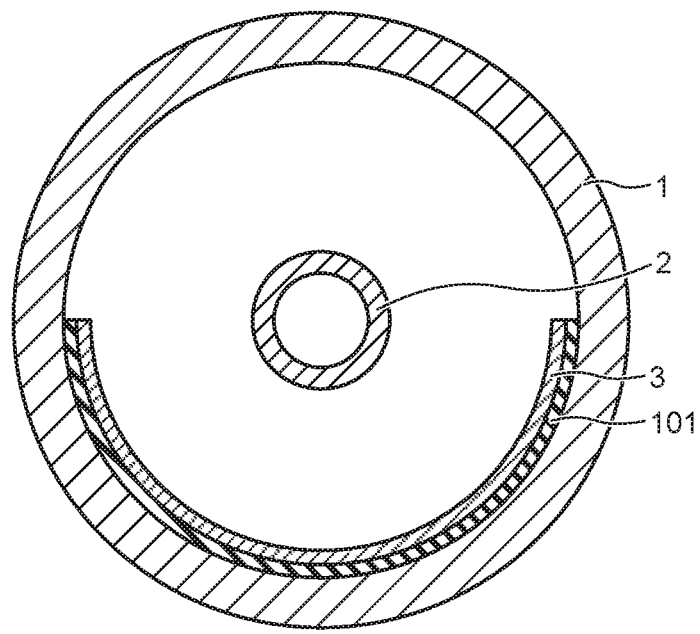
FIG. 3 is a B-B transverse sectional view in FIG. 1.

FIG. 1 is a longitudinal sectional view illustrating a configuration of a gas insulation device according to the present embodiment; FIG. 2 is an enlarged view of an A part in FIG. 1; and FIG. 3 is a transverse sectional view in FIG. 1 looking in the direction of arrows B-B. As illustrated in FIG. 1 to FIG. 3, the gas insulation device according to the present embodiment includes a grounded metal tank 1 in which an insulation gas is contained; a conductor 2 that is an energization part provided in the tank 1; a coat 101 that is an insulation part provided on the inner surface of the tank 1; and a coat 3 that is a non-linear resistive part provided on the coat 101. Note that the gas insulation device according to the present embodiment is, for example, a device that is configured from a gas-insulated switching device such as a bus, a breaker, a disconnector, a grounding switch, a current transformer for an instrument, a voltage transformer for a meter, or the like. In addition, it is readily apparent that the present embodiment can be applied to a gas-insulated switching device.

The tank 1 includes, for example, a grounded cylindrical metal container. At an end part in an axial direction of the container included in the tank 1, a flange part 1a is provided. The tank 1 can be extended in the axial direction by coupling flange parts 1a of containers. The tank 1 is provided, for example, in such a manner that an axis of the tank 1 becomes horizontal. Alternatively, the tank 1 is provided, for example, in such a manner that the axis of the tank 1 becomes horizontal with respect to the surface upon which the tank 1 is provided. The tank 1 is filled with an insulation gas, such as a sulfur hexafluoride ($SF_6$) gas.

The conductor 2 is a conductor across which a voltage is applied and through which a current flows. The conductor 2 is extended, for example, in the axial direction of the tank 1. The conductor 2 is, for example, cylindrical or columnar. The conductor 2 is supported by an insulation spacer (not illustrated).

The coat 101 is a first coat, is an insulating coat, and is formed of insulation material. The insulation material is, for example, resin. The coat 101 is provided, for example, on a lower half of the inner surface of the tank 1.

The coat 3 is a second coat and includes an insulation material containing a non-linear resistive material. The insulation material is, for example, resin. In addition, the non-linear resistive material is, for example, silicon carbide (SiC). Because the coat 3 is isolated from the grounded tank 1 by the insulating coat 101, the coat 3 is electrically floating.

It is known that silicon carbide shows a non-linear resistance characteristic without calcination. That is, silicon carbide shows insulation properties in a low voltage region or a low current region without calcination, but resistance becomes low in a high voltage region or a high current region. As described later, silicon carbide, as opposed to zinc oxide (ZnO), shows a continuous transition between having insulation properties and conductive properties. Silicon carbide is a wide bandgap semiconductor having a large bandgap compared to silicon. Examples or wide bandgap semiconductors other than silicon carbide are gallium nitride and diamond.

The filling factor of silicon carbide in the coat 3 is, for example, in a range from 30% to 80% by volume. This amount of filling is necessary because it enables the silicon carbide to make contact with itself in the coat 3, which is necessary for the coat 3 to show non-linear resistance characteristics. Here, a lower limit value for filling is prescribed as the filling amount with which the silicon carbide makes contact with itself by percolation. In addition, an upper limit value of the amount of filling is prescribed as a critical amount of silicon carbide powder and it is determined such that strength of the coat 3 is ensured because the coat 3 becomes brittle when filled with an amount exceeding the critical filling amount.

Note that the non-linear resistive material included in the coat 3 can be a non-linear resistive material other than silicon carbide and can be, for example, zinc oxide, gallium nitride, or diamond.

In FIG. 1, a tiny metal foreign substance 4 is mixed in the tank 1 and is, for example, on the coat 3.

Each of the coats 3 and 101 is, for example, a coating film formed by coating. That is, the coat 101 is formed, for example, by the application of an insulating coating material, which has resin as a major component, to the inner surface of the tank 1. Also, the coat 3 is formed, for example, by the application of a coating material in which a non-linear resistive material is contained in an insulating coating material having resin as a major component on the coat 101. The coating process includes painting with a brush, spray coating, and electrostatic coating. The electrostatic coating is a kind of coating process that attaches powder to a target by charging the powder with static electricity.

Also, one or both of the coats 3 and 101 can be formed by a method other than coating. In addition, instead of providing the coat 101 on the inner surface of the tank 1, an insulation sheet as an insulation part can be provided on the inner surface of the tank 1. Here, the insulation sheet is a sheet including an insulation material. Similarly, instead of providing the coat 3 on the coat 101, a non-linear resistive sheet as a non-linear resistive part can be provided on the coat 101. Here, the non-linear resistive sheet is a sheet including an insulation material containing a non-linear resistive material. Moreover, a sheet that is an insulation sheet on which the coat 3 is formed, for example, by coating can be provided on the inner surface of the tank 1. In such a manner, an insulation part and a non-linear resistive part laminated on the inner surface of the tank 1 are not limited to the coats 101 and 3 and are what show insulation characteristics and a non-linear resistance characteristics, respectively.

Next, a function of the present embodiment will be described. In a case where a voltage applied to the conductor 2 is low or in a case where the strength of an electric field generated from the conductor 2 is low, a non-linear resistive material in the coat 3 substantially functions as an insulator. In addition, there is the insulating coat 101 between the coat 3 and the inner surface of the tank 1. Thus, movement of an electric charge from the inner surface of the tank 1 to the metal foreign substance 4 on the coat 3 is blocked and electric charge having an opposite polarity to the conductor 2 is not accumulated in the metal foreign substance 4, whereby floating of the metal foreign substance 4 due to the electric attraction force by the electric field, which is generated from the conductor 2, becoming larger than the weight of the metal foreign substance 4 is prevented.

Also, in a case where the voltage applied across the conductor 2 is high or a case where the strength of the electric field generated by the conductor 2 is high, the coat 101 under the coat 3 has insulation properties regardless of the magnitude of the electric field strength while resistance of the non-linear resistive material in the coat 3 becomes low and the coat 3 shows conductive properties. Thus, while the coat 3 becomes a place to which an electric charge is released and the charging of the metal foreign substance 4 on the coat 3 is controlled, charging of the metal foreign substance 4 due to movement of an electric charge, which has an opposite polarity to the conductor 2, from the inner surface of the tank 1 to the metal foreign substance 4 is blocked by the coat 101, whereby floating of the metal foreign substance 4 due to the electric attraction force due to the electric field, which is generated by the conductor 2, becoming larger than weight of the metal foreign substance 4 is prevented.

More specifically, in a case where the voltage applied across the conductor 2 is high or a case where the strength of the electric field generated by the conductor 2 is high, when the metal foreign substance 4 is on the coat 3, an electric field concentration is generated on a side of the coat 3 in a periphery of the metal foreign substance 4, electric field strength becomes higher, and the coat 3 shows conductive properties in the periphery of the metal foreign substance 4 due to the electric field on the side of the coat 3.

When the coat 3 shows conductive properties in the periphery of the metal foreign substance 4, the coat 3 becomes a place to which an electric charge is released and the charging of the metal foreign substance 4 is controlled. In addition, the electric field concentration in the periphery of the metal foreign substance 4 is relaxed and generation of partial discharge is controlled. Here, the electric charge of the metal foreign substance 4 is released in a surface direction of the coat 3 because the insulating coat 101 is under the coat 3.

Figure 4:
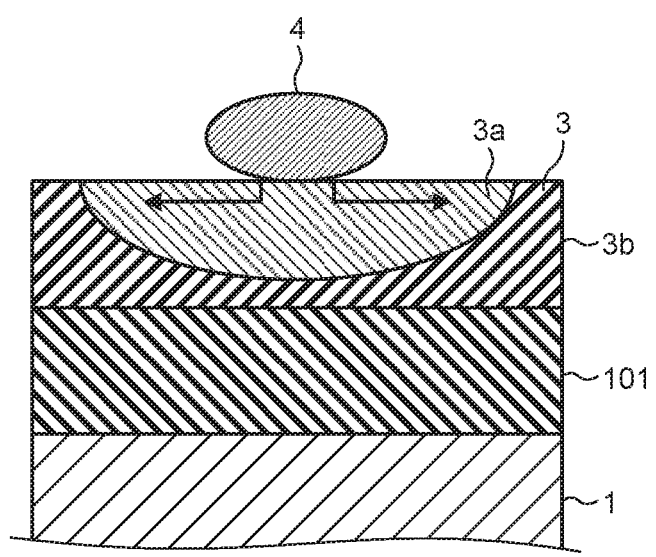
FIG. 4 is a view schematically illustrating a state in which an electric charge is released in a surface direction of a coat from a metal foreign substance.

FIG. 4 is a view schematically illustrating a state in which an electric charge is released in the surface direction of the coat 3 from the metal foreign substance 4. Note that in FIG. 4, the same symbols are assigned to configuration elements identical to those in FIG. 1. In FIG. 4, a conductive part 3a is generated in a part of the coat 3 by the electric field in the periphery of the metal foreign substance 4. The conductive part 3a is surrounded by an insulating part 3b that is the other part of the coat 3. In addition, in FIG. 4, an arrow indicates the moving direction of the electric charge. As illustrated in FIG. 4, the conductive part 3a is generated in a part of the coat 3 in contact with the metal foreign substance 4 due to the electric field concentration on the side of the coat 3 of the metal foreign substance 4; the electric charge of the metal foreign substance 4 is moved and uniformized in the surface direction of the coat 3 in the conductive part 3a; the charging of the metal foreign substance 4 is controlled; the electric field concentration is relaxed; and generation of partial discharge is controlled. Note that the filling factor of the non-linear resistive material can be adjusted in such a manner that the conductive part 3a is localized in the periphery of the metal foreign substance 4.

As described above, according to the present embodiment, the insulating coat 101 is provided on the inner surface of the tank 1 and the coat 3 including an insulation material containing a non-linear resistive material is provided on the coat 101. Thus, while movement of the electric charge from the inner surface of the tank 1 to the metal foreign substance 4 is blocked by the coat 101, the coat 3 shows conductive properties in the periphery of the metal foreign substance 4 and an electric charge is released from the metal foreign substance 4 to the coat 3 in a case where electric field strength in the periphery of the metal foreign substance 4 in contact with the coat 3 is high. Accordingly, it becomes possible to control the behavior of the metal foreign substance 4, to relax the electric field in the periphery of the metal foreign substance 4, and to control generation of partial discharge.

Figure 5:
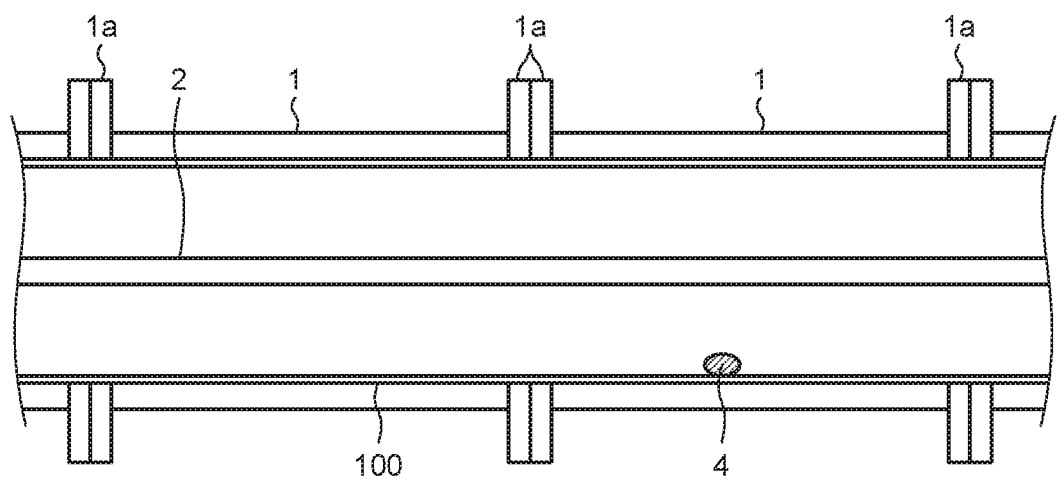
FIG. 5 is a longitudinal sectional view illustrating a configuration of a conventional gas insulation device.

Here, a configuration of a gas insulation device of the present embodiment and that of a conventional gas insulation device are compared with each other and an additional effect of the present embodiment will be described. FIG. 5 is a longitudinal sectional view illustrating the configuration of a conventional gas insulation device. Note that in FIG. 5, the same symbols are assigned to configuration elements identical to those in FIG. 1.

As illustrated in FIG. 5, in the conventional gas insulation device, a coating film 100 is applied to the inner surface of the tank 1. The coating film 100 is formed of a coating material containing zinc oxide (see Patent Literature 1). In the conventional configuration illustrated in FIG. 5, a configuration of applying only one layer of the coating film 100 is included.

The coating film 100 illustrated in FIG. 5 has high-insulation properties because zinc oxide in the coating film 100 substantially functions as an insulator in a case where voltage applied across the conductor 2 is low or a case where the strength of an electric field generated by the conductor 2 is low. Thus, movement of an electric charge from the inner surface of the tank 1 to a metal foreign substance 4 on the coating film 100 is blocked.

More specifically, in a case where the voltage applied across the conductor 2 is high or a case where the strength of the electric field generated by the conductor 2 is high, when the metal foreign substance 4 is on the coating film 100, then an electric field concentration is generated on a side of the coating film 100 in a periphery of the metal foreign substance 4, the electric field strength then becomes higher, and the coating film 100 shows conductive properties in the periphery of the metal foreign substance 4 due to the electric field on the side of the coating film 100. When the coating film 100 shows conductive properties in the periphery of the metal foreign substance 4, then movement of an electric charge between the metal foreign substance 4 and the inner surface of the tank 1 is permitted and an electric charge of the metal foreign substance 4 is released in a film thickness direction of the coating film 100. However, it is difficult to control the charging of the metal foreign substance 4 due to the movement of electric charge from the inner surface of the tank 1 to the metal foreign substance 4. As a result, it becomes difficult to control the behavior of the metal foreign substance 4. In addition, while the electric charge of the metal foreign substance 4 is released in the film thickness direction of the coating film 100 in the conventional gas insulation device, the electric charge of the metal foreign substance 4 is released in the surface direction of the coat 3 in the present embodiment.

Figure 6:
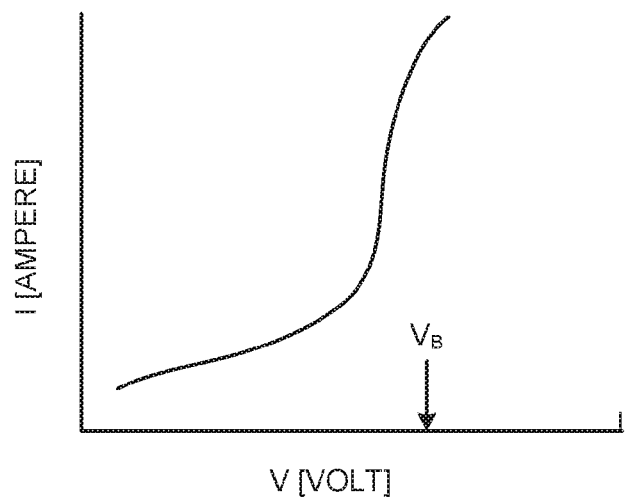
FIG. 6 is a graph illustrating a typical current-voltage characteristic of a non-linear resistive material.
Figure 7:
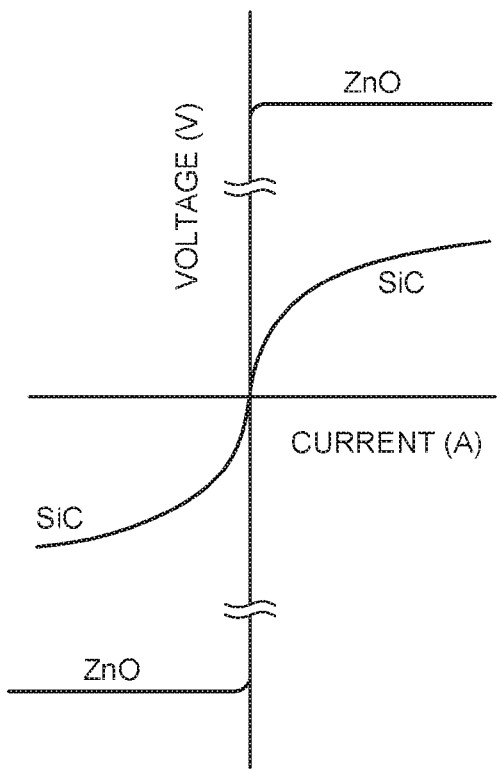
FIG. 7 is a graph of comparing typical varistor characteristics of a zinc oxide and silicon carbide.

Next, an advantage of using silicon carbide as a non-linear resistive material will be described in comparison with a zinc oxide. FIG. 6 is a graph illustrating the typical current-voltage characteristics of a nonlinear resistive material. FIG. 7 is a graph comparing typical varistor characteristics of a zinc oxide and silicon carbide. Similar to silicon carbide, zinc oxide shows non-linear resistance characteristics. However, as described later, the degree of non-linearity varies greatly between the two.

First, typical current-voltage characteristics of a non-linear resistive material will be described. In FIG. 6, typical current-voltage characteristics of a non-linear resistive material is illustrated with a horizontal axis as voltage (V) and a vertical axis as current (I). The non-linear resistive material has high resistance and shows insulation properties at low voltages. However, when the voltage exceeds a critical breakdown voltage $V_B$, the resistance value rapidly decreases and conductive properties are shown.

Next, as illustrated in FIG. 7, transition between insulation properties and conductive properties in a zinc oxide is rapid, and resistance rapidly disappears and non-linear resistance characteristics are abruptly shown when a certain voltage is exceeded. In contrast, transition between showing insulation properties and conductive properties in silicon carbide is continuous and moderate.

Further, it is necessary that a film thickness of a coat 3 be set in such a manner that the charging of a metal foreign substance 4 is controlled such that the applied voltage in a film thickness direction and the non-linear resistance characteristics of a non-linear resistive material are taken into consideration.

In a case of using a zinc oxide as a non-linear resistive material contained in the coat 3, there is possibility that a conductive region and an insulating region are mixed on the coat 3 with respect to the same high-electric field because of a variation in film thickness of the coat 3 and that an effect of controlling the charging of the metal foreign substance 4 is decreased. Thus, in a case of using zinc oxide as a non-linear resistive material, it is necessary to control the variation in film thickness of the coat 3.

In contrast, in a case of using silicon carbide as a non-linear resistive material contained in the coat 3, the coat 3 shows the moderate non-linear resistance characteristics illustrated in FIG. 7. Thus, transition between insulation properties and conductive properties is continuous, and the degree of conductive properties varies only a little and the coat 3 as a whole shows similar electric characteristics even when there are some variations in the film thickness of the coat 3.

That is, in a case of using silicon carbide as a non-linear resistive material, variation in the film thickness of the coat 3 has a small effect on controlling the charging of the metal foreign substance 4 compared to a case with using zinc oxide as a non-linear resistive material. Thus, a variation in the film thickness is permissible and the process of the coat 3 becomes more productive.

Also, the non-linear resistance characteristics of zinc oxide is due to calcination. Thus, in a case where the coat 3 is formed by coating, when zinc oxide is used as the non-linear resistive material contained in the coat 3, it is necessary to apply a coating material into which powder of a calcined zinc oxide is mixed or to calcine the coat 3 after application of a coating material containing zinc oxide. In either case, a calcination process is necessary before or after application and the production processes increase.

In contrast, silicon carbide shows non-linear resistance characteristics without calcination. Accordingly, in a case of using silicon carbide as a non-linear resistive material, it as not necessary to calcine silicon carbide. Thus, there is an advantage in that the production processes decrease compared to a case with using zinc oxide as a non-linear resistive material.

Also, in the present embodiment, the coat 3 is provided on the coat 101. Thus, it is possible to use the existing tank 1, on an inner surface of which an insulating coating material is applied, and is possible to provide the coat 3 on this coating film.

Note that in a case of forming the coat 3 by coating, filler may or may not be mixed in the coating material containing a non-linear resistive material. The filler, such as alumina or silica as an insulation material, is to ensure strength and does not have an effect on controlling the behavior of the metal foreign substance 4.

In FIG. 3, the coat 101 and the coat 3 are provided on a lower-half side of the inner surface of the tank 1, but they can be provided in a part on the lower side of the inner surface of the tank 1.

Figure 8:
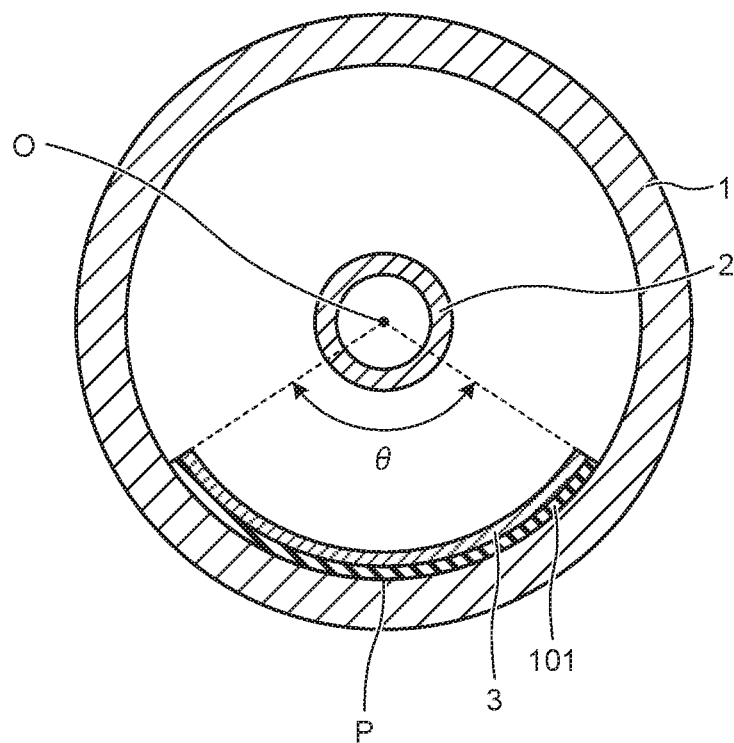
FIG. 8 is a view illustrating a different example of a B-B transverse sectional view in FIG. 1.

FIG. 6 is a view illustrating a different example of a transverse sectional view taken in the direction of B-B in FIG. 1. In FIG. 8, O indicates the center of a tank 1 and P indicates the lowermost part of an inner surface of the tank 1. In FIG. 8, a coat 101 and a coat 3 are provided in a certain angle range θ, which at least includes the lowermost part P, on the inner surface of the tank 1. Because a metal foreign substance 4 moves toward a lower side due to its own weight, the coat 101 and the coat 3 are preferably provided at least at a part of the lower side of the inner surface of the tank 1. Specifically, because the metal foreign substance 4 tends to move toward the lowermost part P due to its own weight, the coat 101 and the coat 3 are preferably provided in such a manner as to cover at least the lowermost part P on the inner surface of the tank 1.

Figure 9:
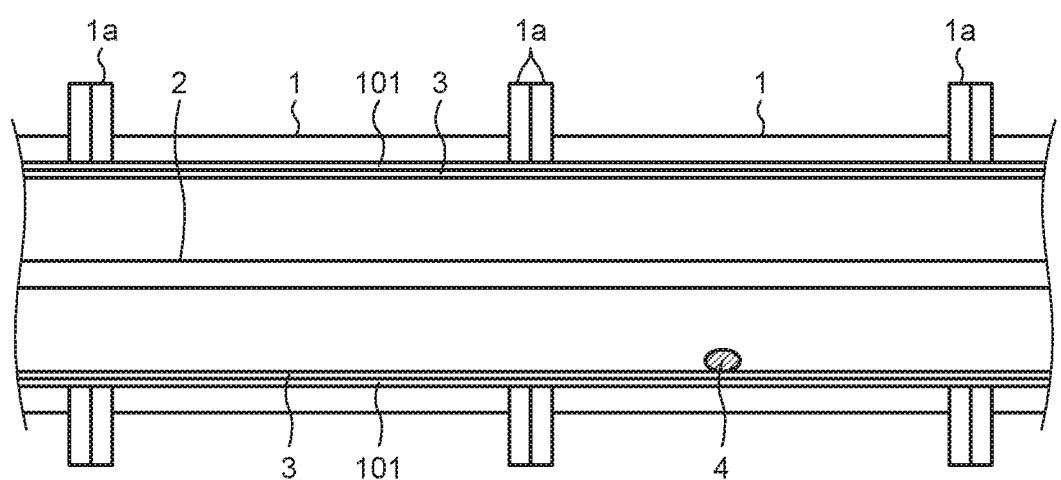
FIG. 9 is a view illustrating an example of arranging a coat on a whole inner surface of a tank.

Further, because a metal foreign substance 4 can be attached to an upper side of the inner surface of the tank 1, an effect of the present embodiment is acquired also by providing a coat 101 and a coat 3 on a part or a whole of the upper side of the inner surface of the tank 1. For example, the coat 101 and the coat 3 can be provided on the whole inner surface of the tank 1. In FIG. 9, an example of arranging the coat 101 and the coat 3 on the whole inner surface of the tank 1 is illustrated. In such a manner, even in a case where the coat 101 and the coat 3 are provided at least on a part of the inner surface of the tank 1, there is an effect of controlling the charging of the metal foreign substance 4 in contact with the coat 101 and the coat 3; controlling the behavior of the metal foreign substance 4; relaxing the electric field in a periphery of the metal foreign substance 4; and controlling generation of partial discharge.

Second Embodiment

Figure 10:
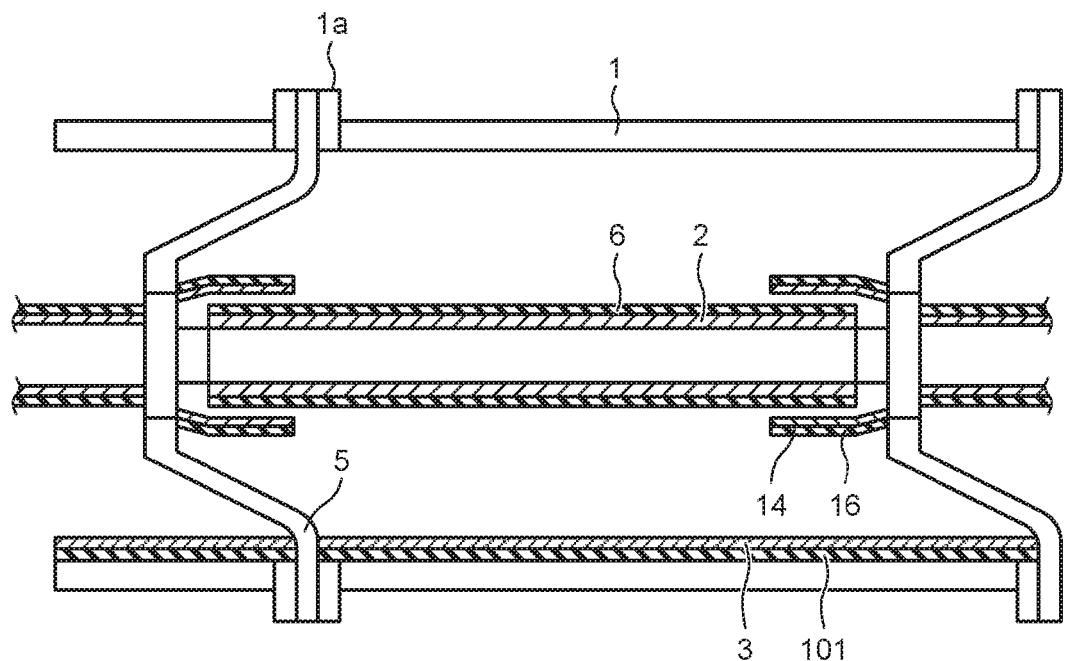
FIG. 10 is a longitudinal sectional view illustrating a configuration of a gas insulation device according to a second embodiment.

FIG. 10 is a longitudinal sectional view illustrating a configuration of a gas insulation device according to the present embodiment. As illustrated in FIG. 10, the gas insulation device of the present embodiment includes the grounded metal tank 1 in which an insulation gas is contained; a conductor 2 that is provided in the tank 1, on a surface of which an alumite film 6 on which a sealing treatment is performed is formed and across which a voltage is applied; an insulation spacer 5 that is held between flange parts 1a of the tank 1 and that supports the conductor 2; an electric field relaxation shield 14 that is attached to the insulation spacer 5 and covers a part of the conductor 2 on a side of the insulation spacer 5 and that has, formed on an outer surface, an alumite film 16 on which a sealing treatment is performed; a coat 101 that is an insulation part provided on the inner surface of the tank 1; and a coat 3 that is a non-linear resistive part provided on the coat 101.

The conductor 2, for example, is formed of aluminum. The conductor 2 is, for example, cylindrical shaped. On the surface of the conductor 2, the alumite film 6 on which sealing treatment is performed further to improve the strength of electrical breakdown field is formed.

The electric field relaxation shield 14, for example, is formed of aluminum. On the outer surface of the electric field relaxation shield 14, the alumite film 16 on which sealing treatment is performed to further improve the strength of electrical breakdown field is formed. The electric field relaxation shield 14 covers a periphery of a part of the conductor 2 and is a part supported by the insulation spacer 5. Note that a configuration is possible in which the alumite film 16 is not provided.

The other configuration of the present embodiment is similar to that of the first embodiment. Thus, in FIG. 10, the same symbols are assigned to the configuration elements identical to those of the first embodiment illustrated in FIG. 1 to FIG. 3, and a detailed description thereof is omitted.

Next, a function and an effect acquired by providing the alumite films 6 and 16 will be described. Note that in the following, the alumite film 6 will be described but the alumite film 16 is similar.

First, a case where a surface of the conductor 2 is not coated will be described. On the surface of the conductor 2, there are many surface protrusions due to recessions/protrusions at the micrometer level. On the surface protrusions, the discharge generates by electrons emitted from an electric field from the surface protrusions, and the withstanding voltage decreases thereby. Specifically, when the surface area of the conductor 2 is increased, the number of surface protrusions is increased and the probability of discharge is statistically increased, whereby the strength of electrical breakdown field decreases. In a case where the conductor 2 has a coaxial cylindrical structure, there is an electric field gradient in a radial direction of the conductor 2, but the electric field is constant in a circumferential direction and an axial direction of the conductor 2. Thus, the strength of electric field on the whole surface of the conductor 2 is identical. Generally, the start of discharge and the breakdown of insulation are determined by the electric field strength in an insulator. However, in a case of the insulation gas in the tank 1, the strength of electrical breakdown field depends on the electrode area, which is the surface area of the conductor 2, due to the area effect caused by surface protrusions on the conductor 2. Specifically, in a case of a gas insulation device for a high voltage, when an electrode area becomes equal to or larger than 100000 mm$^2$, then the strength of electrical breakdown field becomes significantly low due to the area effect compared to a case of a small electrode area.

Thus, conventionally, an insulation film is generally formed on a surface of a conductor 2 in order to control an influence of a surface protrusion and to improve a withstanding voltage. This insulation film controls an electron emitted from an electric field generated from surface protrusions of the conductor 2 and relaxes electric field concentration due to the surface protrusions, and thus the discharge is controlled and a withstanding voltage is improved. In addition, this insulation film is generally an alumite film since the conductor 2 is mainly made of aluminum (see, for example, Japanese Patent Application Laid-Open No. 62-141909).

A method of forming an alumite film is generally anodization treatment by an electrolytic method in which energization is performed with the aluminum conductor 2. The aluminum conductor 2 is soaked in an electrolytic solution such as a sulfuric acid aqueous solution, a phosphoric acid aqueous solution, or a chromic acid aqueous solution in a treatment tank to be a positive electrode; and an electrode separately soaked in this electrolytic solution is to be a negative electrode. Alumite is formed on a surface of the conductor 2 by oxidization of a surface of aluminum included. In the conductor 2. In this oxidation process, a certain number of small holes with a diameter of a several hundreds of nanometers are generated in the alumite film. When there are small holes in the alumite film, an electron emitted from the conductor 2 being a base is emitted through the small holes, which makes it difficult to control discharge.

Thus, in the present embodiment, sealing is processed on an alumite film in order to seal holes in the alumite film after the alumite film is formed on a surface of the conductor 2, and the surface of the conductor 2 is covered with the alumite film 6 on which the sealing treatment is performed.

Here, the sealing treatment method is, for example, via steam sealing. In the steam sealing, the conductor 2 or the electric field relaxation shield 14 on which the alumite film is formed is put in a kiln that is a pressure container; and a steam pressure of, for example, two to five atmospheres is applied with steam, whereby treatment is performed. As a different sealing treatment method, for example, there is a method with boiling water. When sealing treatment is performed with pressure steam, hydrate ($Al_2O_3$—$H_2O$) is generated on a surface of alumite.

Figure 11:
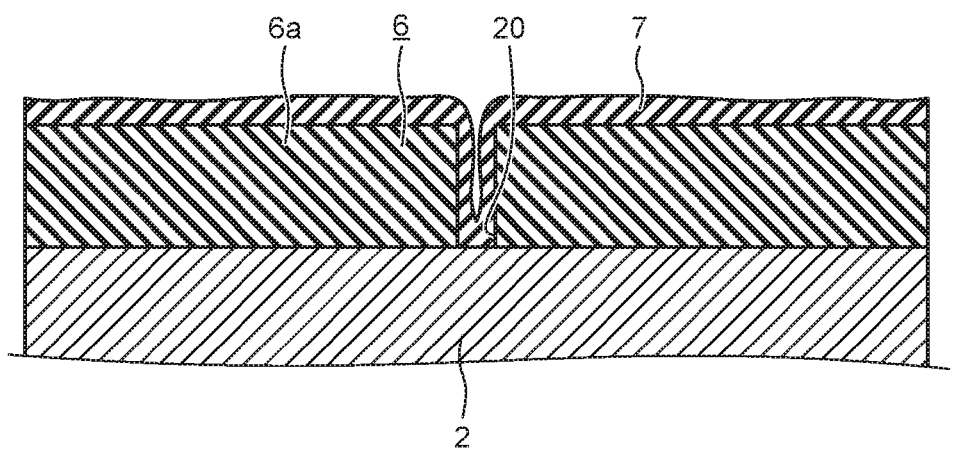
FIG. 11 is a section-enlarged view of a surface of a conductor.

FIG. 11 is a section-enlarged view of a surface of the conductor 2. As illustrated in FIG. 11, an alumite film 6a is formed on the surface of the conductor 2 and a hole 20 is formed in the alumite film 6a. Also, a hydrate film 7 is formed on the alumite film 6a by sealing treatment; and the film 7 is also formed in the hole 20, whereby a hole diameter of the hole 20 becomes small and the hole 20 is sealed. The alumite film 6 includes the alumite film 6a and the hydrate film 7 formed on the alumite film 6a.

Figure 12:
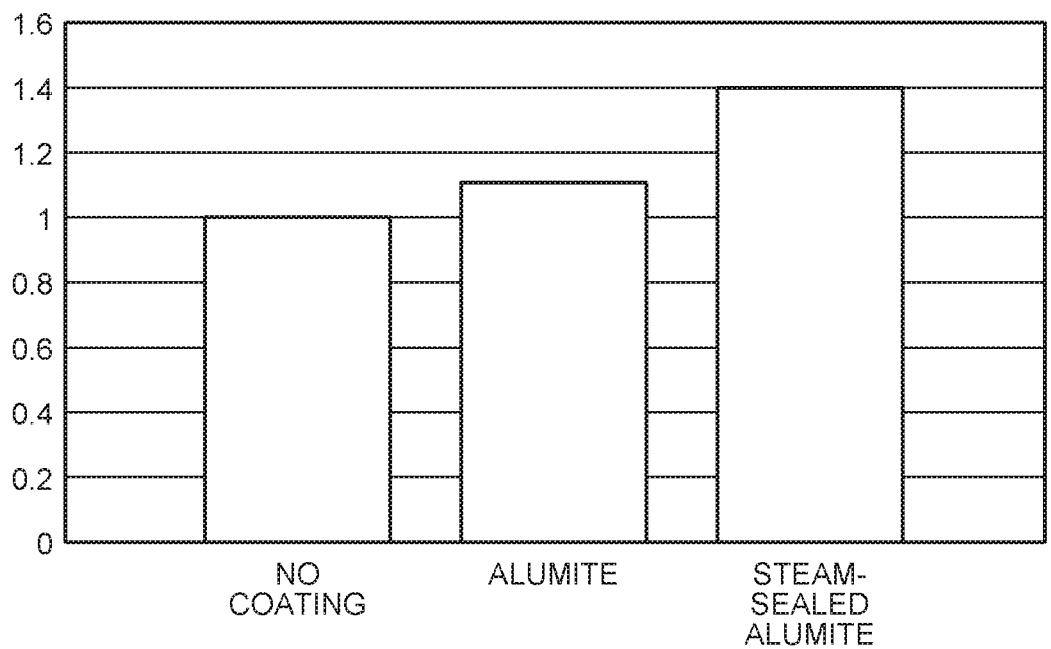
FIG. 12 is a view of comparing voltage-withstanding performance in a sulfur hexafluoride gas in a case where coating is not formed on a conductor; a case where an alumite film is formed; and a case where an alumite film on which steam sealing treatment is performed is formed.

FIG. 12 is a view of comparing voltage-withstanding performance in a sulfur hexafluoride gas in a case where coating is not formed on the conductor 2, a case where the alumite film 6a is formed, and a case where the alumite film 6 on which steam sealing treatment is performed is formed. In the drawing, "no coating" indicates a case where coating is not formed on the conductor 2; "alumite" indicates a case where only the alumite film 6a is formed; and "steam-sealed alumite" indicates a case where the alumite film 6 on which steam sealing treatment is performed is formed. The voltage-withstanding performance is expressed by a relative value with the case of "no coating" as a reference. As it is obvious from FIG. 12, the alumite film 6 on which the steam sealing treatment is performed has improved voltage-withstanding performance compared to the case of no coating or the case where only the alumite film 6a is formed.

As described above, according to the present embodiment, the alumite film 6, on which the sealing treatment is performed, is formed on the surface of the conductor 2. Thus, it becomes possible to control discharge from the surface of the conductor 2 and to relax micro electric field concentration on the surface of the conductor 2 by forming the alumite film 6 with a high insulation property. Accordingly, it is possible to control a decrease in a withstanding voltage due to an electrode area effect and to provide a gas insulation device with high insulation reliability.

Further, according to the present embodiment, the alumite film 16, on which the sealing treatment is performed, is also formed on an outer surface of the electric field relaxation shield 14. Thus, an effect similar to that in the case where the alumite film 6, on which the sealing treatment is performed, is formed on the surface of the conductor 2 is achieved.

Note that in a case where a different electric field relaxation shield to cover an inner element of a gas insulation device is provided in the gas insulation device, it is also possible to cover an outer surface of the different electric field relaxation shield with the alumite film on which the sealing treatment is performed. For example, in a case where a gas insulation device is a disconnector, it is possible to form an alumite film, on which the sealing treatment is performed, on a surface of a disconnector shield that covers a fixed contact of the disconnector.

In addition, according to the present embodiment, the insulating coat 101 is provided on the inner surface of the tank 1 and the coat 3 including an insulation material containing a non-linear resistive material is provided on the coat 101, whereby an effect similar to that of the first embodiment is acquired.

Moreover, according to the present embodiment, it is structured that the coats 101 and 3 are serially laminated on the inner surface of the tank 1 and that sealing is processed on alumite that covers the surface of the conductor 2 on a side of the conductor 2. Thus, it is possible to improve voltage-withstanding performance on both of the side of the tank 1 and the side of the conductor 2 so as for a diameter of the tank 1 to reduce.

Third Embodiment

Figure 13:
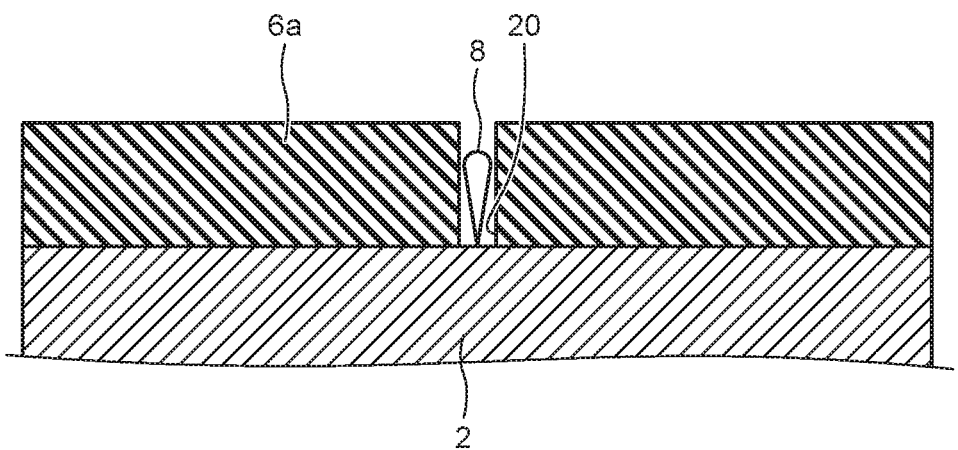
FIG. 13 is a view illustrating a state in which an electronic avalanche grows in a hole in an alumite film.
Figure 14:
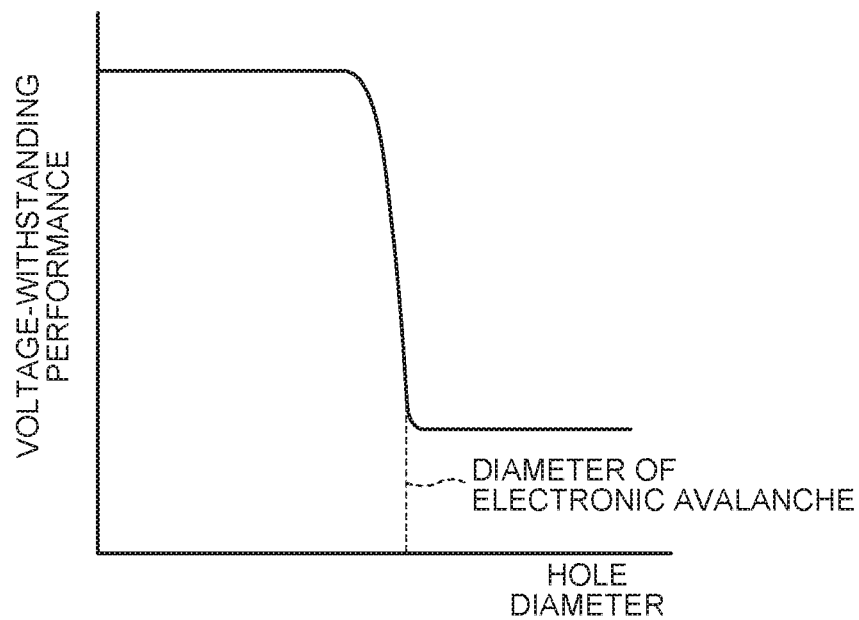
FIG. 14 is a view illustrating a relation between a hole diameter in an alumite film and voltage-withstanding performance.

FIG. 13 is a view illustrating a state in which an electronic avalanche grows in a hole in an alumite film, and FIG. 14 is a view illustrating a relation between a hole diameter in an alumite film and voltage-withstanding performance.

As illustrated in FIG. 13, an alumite film 6a is formed on a surface of a conductor 2. On the alumite film 6a, sealing treatment is not performed and there is a hole 20 in the alumite film 6a. In a state in which there is the hole 20 in the alumite film 6a, an electron is emitted from the conductor 2 through the hole 20.

As illustrated in FIG. 13, an electron emitted from the conductor 2 is accelerated by an electric field, and the accelerated electron collides with a neutral molecule and ionizes the molecule, whereby an electron is newly generated. Electrons that are continuously generated grow to become an electronic avalanche 8. The electronic avalanche 8 grows in a spindle shape in a traveling direction of the electronic avalanche 8. When a leading end of the electronic avalanche 8 reaches a condition for a transition to a streamer, discharging is started.

When a hole diameter of the hole 20 in the alumite film 6a is larger than a diameter of a leading end part of the electronic avalanche 8, the electronic avalanche 8 keeps growing without colliding with a wall of the hole 20. When the number of electrons in the electronic avalanche 8 reaches a certain number such as $10^8$, the electronic avalanche 8 transitions to a streamer, which leads to an insulation breakdown. A diameter of the electronic avalanche 8 can be calculated by the following expression.

$$\text{Diameter of electronic avalanche} = \sqrt{\{(4 \times \text{diffusion coefficient} \times \text{development distance})/\text{electron velocity}\}}$$

Here, the diameter is the maximum diameter of the spindle-shaped electronic avalanche 8.

When it is assumed that the development distance is a distance in which the electronic avalanche 8 develops until the leading end of the electronic avalanche 8 reaches the condition for a transition to a streamer, the development distance is about 10 μm in the air and is equal to or shorter than 100 nm in a pressurized sulfur hexafluoride gas. In a case of pressurized gas, a diameter of the electronic avalanche 8 is smaller than a hole diameter in a general alumite film 6a on which sealing treatment is not performed. Thus, growth of the electronic avalanche 8 is not interrupted by collision to a side wall of the hole 20, the electronic avalanche 8 transitions to a streamer after the growth, and discharge is started.

Thus, when a hole diameter in the alumite film 6a is smaller than a diameter of the electronic avalanche 8, the growth of the electronic avalanche 8 is blocked by collision to the side wall of the hole 20 and it becomes impossible to form discharge by a streamer transition. As a result, voltage-withstanding performance is improved as illustrated in FIG. 14. For the improvement, a hole diameter of alumite is controlled to be equal to or smaller than a diameter of an electronic avalanche by the sealing treatment.

Thus, similar to the second embodiment, in the present embodiment, in a case of covering the surface of the conductor 2 with an alumite film 6 on which sealing treatment is performed, the sealing treatment is performed such that a hole diameter in the alumite film 6 after the sealing treatment becomes smaller than a diameter of the electronic avalanche 8 generated in an insulation gas. That is, on the alumite film 6, a hydrate film 7 is also formed in the hole 20 as illustrated in FIG. 11, whereby sealing treatment is performed in such a manner that a hole diameter of the hole 20 in which the film 7 is formed becomes smaller than a diameter of the electronic avalanche 8.

According to the present embodiment, it is possible to control emission of an electron from the surface of the conductor 2 and to control growth of the electronic avalanche 8, whereby voltage-withstanding performance is improved and a gas insulation electric device with high insulation reliability can be provided.

Note that the present embodiment can be also applied to an alumite film 16 on an electric field relaxation shield 14 in a similar manner.

The other configuration, function, and effect of the present embodiment are similar to those of the second embodiment.

Fourth Embodiment

Figure 15:
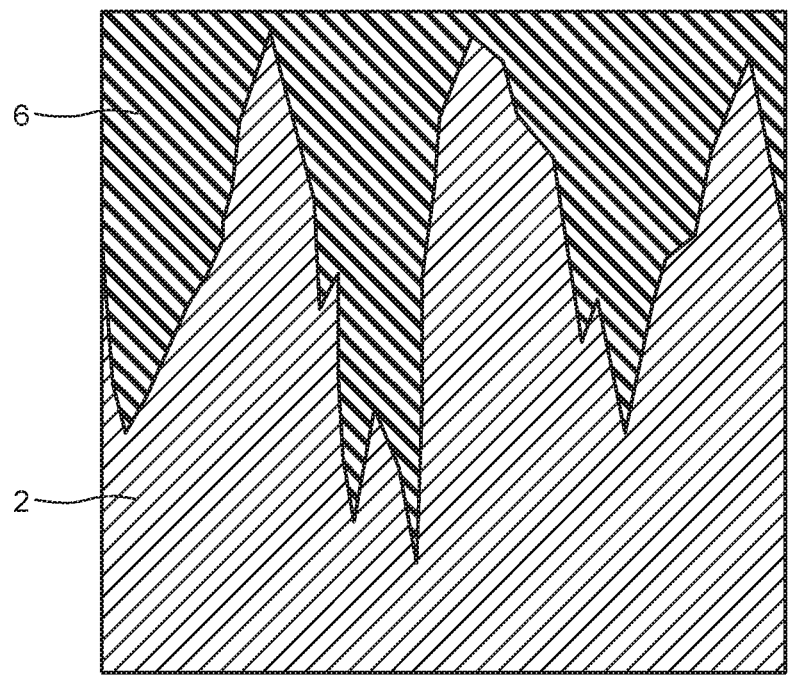
FIG. 15 is a sectional view illustrating a relation between a recession/protrusion on a surface of a conductor that is a base of an alumite film and a film thickness of the alumite film.

FIG. 15 is a sectional view illustrating a relation between a recession/protrusion on a surface of a conductor 2 that is a base of an alumite film 6 and a film thickness of the alumite film 6. As illustrated in FIG. 15, a recession/protrusion is formed on the surface of the conductor 2 and the alumite film 6 is formed with a film thickness with which the recession/protrusion on the surface is filled.

Discharge becomes likely to be formed along with an increase in a surface area of the conductor 2 due to supply of an initial electron emitted from a micro surface protrusion on the surface of the conductor 2 and a locally-large potential gradient formed by the surface protrusion, so that a withstanding voltage decreasing phenomenon by an area effect of the conductor 2 occurs.

Thus, in the present embodiment, in order to control the supply of an initial electron and to make a potential gradient smaller, the alumite film 6 is formed with a film thickness with which the recession/protrusion on the surface of the conductor 2 is filled. That is, the film thickness of the alumite film 6 is made to be thicker than the maximum roughness of the recession/protrusion on the surface of the conductor 2.

According to the present embodiment, since the alumite film 6 is formed with a film thickness with which a recession/protrusion on the surface of the conductor 2 is filled, it is possible to control a decrease in a withstanding voltage due to an electrode area effect and to provide a gas insulation electric device with high insulation reliability.

Note that the present embodiment can be also applied to an alumite film 16 on an electric field relaxation shield 14 in a similar manner.

The other configuration, function, and effect of the present embodiment are similar to those of the second and third embodiments.

INDUSTRIAL APPLICABILITY

As described above, a gas insulation device according to the present invention is suitable for a device included is a gas-insulated switching device.

REFERENCE SIGNS LIST

1 tank, 1a flange part, 2 conductor, 3, 101 coat, 3a conductive part, 3b insulating part, 4 metal foreign substance, 5 insulation spacer, 6, 6a, 16 alumite film, 7 film, 8 electronic avalanche, 14 electric field relaxation shield, 20 hole, 100 coating film.

The invention claimed is:

1. A gas insulation device comprising:
a grounded metal tank that contains therein an insulation gas;
a conductor provided in the tank and across which a voltage is applied,
a surface of the conductor having an alumite film formed thereon, the alumite film having been subjected to a sealing treatment;
an insulation part provided on an inner surface of the tank; and
a non-linear resistive part provided on the insulation part and formed of insulation material containing non-linear resistive material.

2. The gas insulation device according to claim 1, wherein the insulation part is a first coat formed on the inner surface of the tank, and
the non-linear resistive part is a second coat formed on the first coat.

3. The gas insulation device according to claim 2, wherein each of the first and second coats is a coating film,
the first coat is formed by application of a coating material containing an insulating coating component, and
the second coat is formed by application of a coating material containing an insulating coating component and the non-linear resistive material.

4. The gas insulation device according to claim 2, wherein the non-linear resistive material is silicon carbide.

5. The gas insulation device according to claim 4, wherein a filling factor of the silicon carbide in the second coat is within a range between 30% and 80% by volume.

6. The gas insulation device according to claim 2, wherein the non-linear resistive material is zinc oxide.

7. The gas insulation device according to claim 1, wherein steam sealing is performed on the alumite film as the sealing treatment.

8. The gas insulation device according to claim 1, wherein the sealing treatment is performed on the alumite film in such a manner that a hole diameter of a hole formed in the alumite film is smaller than a diameter of an electronic avalanche.

9. The gas insulation device according to claim 1, wherein the alumite film is formed with a film thickness such that a recession/protrusion formed on the surface of the conductor is filled.

10. The gas insulation device according to claim 1, comprising:
an insulation spacer that supports the conductor; and
an electric field relaxation shield that is attached to the insulation spacer and that covers a part of the conductor, wherein
an alumite film on which a sealing treatment is performed is formed on an outer surface of the electric field relaxation shield.

* * * * *